(12) United States Patent  (10) Patent No.: US 8,441,702 B2
Do et al.  (45) Date of Patent: May 14, 2013

(54) SCANNING AND CAPTURING DIGITAL IMAGES USING RESIDUE DETECTION

(75) Inventors: Lydia Mai Do, Raleigh, NC (US); Pamela Ann Nesbitt, Tampa, FL (US); Lisa Anne Seacat DeLuca, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 381 days.

(21) Appl. No.: 12/624,735

(22) Filed: Nov. 24, 2009

(65) Prior Publication Data

US 2011/0122458 A1 May 26, 2011

(51) Int. Cl.
*H04N 1/46* (2006.01)

(52) U.S. Cl.
USPC ............ 358/538; 358/474; 358/452; 358/506

(58) Field of Classification Search .................. 358/505, 358/514, 526, 537, 540, 452, 474, 538
See application file for complete search history.

(56) References Cited

U.S. PATENT DOCUMENTS

| 3,873,769 | A |   | 3/1975  | Cotter |             |
|-----------|---|---|---------|--------|-------------|
| 4,393,410 | A |   | 7/1983  | Ridge et al. | |
| 4,538,182 | A | * | 8/1985  | Saito et al. | 358/538 |
| 4,577,058 | A |   | 3/1986  | Collins | |
| 4,687,317 | A |   | 8/1987  | Appel et al. | |
| 4,751,583 | A |   | 6/1988  | Levine | |
| 4,771,336 | A |   | 9/1988  | Ohtorii | |
| 4,987,497 | A | * | 1/1991  | Yoshimura | 358/452 |
| 5,075,787 | A | * | 12/1991 | Shaughnessy et al. | 358/452 |
| 5,103,490 | A | * | 4/1992  | McMillin | 382/284 |
| 5,259,041 | A | * | 11/1993 | Kato et al. | 382/164 |
| 5,465,155 | A |   | 11/1995 | Edgar | |
| 5,486,166 | A |   | 1/1996  | Bishop et al. | |
| 5,574,577 | A |   | 11/1996 | Wally, Jr. et al. | |
| 5,630,168 | A |   | 5/1997  | Rosebrugh et al. | |
| 5,781,668 | A |   | 7/1998  | Starkweather | |
| 5,838,326 | A |   | 11/1998 | Card et al. | |
| 6,014,662 | A |   | 1/2000  | Moran et al. | |
| 6,373,602 | B1 | * | 4/2002 | Kohler et al. | 358/538 |
| 6,493,115 | B1 | * | 12/2002 | Kanno et al. | 358/538 |
| 6,561,422 | B1 | * | 5/2003 | Cariffe | 235/454 |

(Continued)

FOREIGN PATENT DOCUMENTS

DE  19804028 A1  8/1998
EP  0450196 A1  10/1991

(Continued)

OTHER PUBLICATIONS

U.S. Appl. No. 11/868,513, filed Oct. 7, 2007, Do et al.

(Continued)

*Primary Examiner* — King Poon
*Assistant Examiner* — Ted Barnes
(74) *Attorney, Agent, or Firm* — Yee & Associates, P.C.; Jeffrey S. LaBaw (57) ABSTRACT

A mechanism for scanning and capturing digital images using residue detection. Upon detecting a document placed on a scanning surface of a scanning device, the illustrative embodiments detect a residue deposited on the document. The illustrative embodiments determine a portion of the document to be scanned based on a location of the residue on the document. The illustrative embodiments then scan the portion of the document.

14 Claims, 4 Drawing Sheets

U.S. PATENT DOCUMENTS

| | | | |
|---|---|---|---|
| 6,561,678 B2 | 5/2003 | Loughrey | |
| 6,571,279 B1 | 5/2003 | Herz et al. | |
| 6,581,104 B1 | 6/2003 | Bereiter | |
| 6,636,831 B1 | 10/2003 | Profit, Jr. et al. | |
| 6,646,765 B1* | 11/2003 | Barker et al. | 358/474 |
| 7,877,707 B2 | 11/2003 | Barker et al. | |
| 6,708,176 B2 | 3/2004 | Strunk et al. | |
| 6,751,780 B1 | 6/2004 | Neff et al. | |
| 6,753,981 B1 | 6/2004 | Park | |
| 6,806,636 B2 | 10/2004 | Kang et al. | |
| 6,839,669 B1 | 1/2005 | Gould et al. | |
| 6,850,252 B1 | 2/2005 | Hoffberg | |
| 6,894,715 B2 | 5/2005 | Henrikson | |
| 6,915,626 B2 | 7/2005 | Carton | |
| 6,924,741 B2 | 8/2005 | Tamayama et al. | |
| 6,938,203 B1 | 8/2005 | Dimarco et al. | |
| 6,970,607 B2 | 11/2005 | Jia et al. | |
| 6,970,821 B1 | 11/2005 | Shambaugh et al. | |
| 6,981,649 B2 | 1/2006 | Jaeger et al. | |
| 6,999,932 B1 | 2/2006 | Zhou | |
| 7,002,712 B2* | 2/2006 | Barker et al. | 358/474 |
| 7,035,804 B2 | 4/2006 | Saindon et al. | |
| 7,079,293 B2 | 7/2006 | Risheq | |
| 7,148,998 B2* | 12/2006 | Baggs et al. | 358/2.1 |
| 7,174,056 B2 | 2/2007 | Silverbrook et al. | |
| 7,177,931 B2 | 2/2007 | Athey et al. | |
| 7,194,217 B2 | 3/2007 | Hosoi | |
| 7,200,280 B2 | 4/2007 | Enomoto | |
| 7,200,576 B2 | 4/2007 | Steeves et al. | |
| 7,209,124 B2 | 4/2007 | Hunt et al. | |
| 7,257,531 B2 | 8/2007 | Holub | |
| 7,290,950 B2* | 11/2007 | Donahoe et al. | 400/76 |
| 7,373,590 B2 | 5/2008 | Woolf et al. | |
| 7,383,307 B2 | 6/2008 | Kirkland et al. | |
| 7,401,297 B2 | 7/2008 | Hori et al. | |
| 7,441,706 B1 | 10/2008 | Schuessler et al. | |
| 7,450,086 B2 | 11/2008 | Thielman et al. | |
| 7,457,012 B2 | 11/2008 | Fang | |
| 7,466,873 B2 | 12/2008 | Eschbach et al. | |
| 7,475,110 B2 | 1/2009 | Kirkland et al. | |
| 7,493,566 B2 | 2/2009 | Nakajima et al. | |
| 7,519,222 B2 | 4/2009 | Kisilev et al. | |
| 7,533,349 B2 | 5/2009 | Saul et al. | |
| 7,535,489 B2 | 5/2009 | Nonaka et al. | |
| 7,565,330 B2 | 7/2009 | Steeves et al. | |
| 7,567,908 B2 | 7/2009 | Bodin et al. | |
| 7,577,295 B2* | 8/2009 | Constantin et al. | 382/175 |
| 7,599,517 B2 | 10/2009 | Kogure et al. | |
| 7,649,525 B2 | 1/2010 | Chen et al. | |
| 7,710,391 B2 | 5/2010 | Bell et al. | |
| 7,742,197 B2 | 6/2010 | Takiyama et al. | |
| 7,743,348 B2* | 6/2010 | Robbins et al. | 715/863 |
| 7,765,229 B2 | 7/2010 | Samji et al. | |
| 7,784,087 B2 | 8/2010 | Yami et al. | |
| 7,830,408 B2 | 11/2010 | Asthana et al. | |
| 7,856,477 B2 | 12/2010 | Libbey et al. | |
| 7,870,493 B2 | 1/2011 | Pall et al. | |
| 7,911,453 B2 | 3/2011 | Wilson et al. | |
| 7,916,946 B2* | 3/2011 | Hanano | 382/175 |
| 7,924,477 B1 | 4/2011 | Malzbender et al. | |
| 7,929,805 B2 | 4/2011 | Wang et al. | |
| 7,937,319 B2 | 5/2011 | Kennis et al. | |
| 7,970,870 B2 | 6/2011 | Hinckley et al. | |
| 7,975,065 B2 | 7/2011 | Dunning et al. | |
| 8,009,147 B2 | 8/2011 | Chang et al. | |
| 8,019,127 B2 | 9/2011 | Misra | |
| 8,022,941 B2 | 9/2011 | Smoot | |
| 8,023,766 B1 | 9/2011 | Bergman et al. | |
| 8,063,888 B2 | 11/2011 | McFarlane et al. | |
| 8,085,323 B2 | 12/2011 | Tanaka et al. | |
| 8,094,129 B2 | 1/2012 | Izadi et al. | |
| 8,102,575 B2 | 1/2012 | Hattori | |
| 8,139,036 B2 | 3/2012 | Do et al. | |
| 2002/0031282 A1* | 3/2002 | Ideyama | 382/309 |
| 2002/0178190 A1 | 11/2002 | Pope et al. | |
| 2003/0066073 A1 | 4/2003 | Rebh | |
| 2003/0126162 A1 | 7/2003 | Yohe et al. | |
| 2003/0160862 A1 | 8/2003 | Charlier et al. | |
| 2003/0204403 A1 | 10/2003 | Browning | |
| 2003/0208598 A1 | 11/2003 | Athey et al. | |
| 2003/0231801 A1 | 12/2003 | Baggs et al. | |
| 2004/0004733 A1 | 1/2004 | Barker et al. | |
| 2004/0130750 A1* | 7/2004 | Ushida et al. | 358/1.16 |
| 2004/0139391 A1 | 7/2004 | Stumbo et al. | 715/512 |
| 2004/0190772 A1* | 9/2004 | Constantin et al. | 382/175 |
| 2004/0196503 A1 | 10/2004 | Kurtenbach et al. | |
| 2004/0224674 A1 | 11/2004 | O'Farrell et al. | |
| 2005/0110175 A1* | 5/2005 | Stover | 264/1.34 |
| 2005/0111894 A1 | 5/2005 | Hosoi | |
| 2005/0149364 A1 | 7/2005 | Ombrellaro | |
| 2005/0158794 A1* | 7/2005 | Hogue et al. | 435/7.1 |
| 2005/0161840 A1* | 7/2005 | Stover et al. | 264/1.7 |
| 2005/0175827 A1* | 8/2005 | Hebrink et al. | 428/212 |
| 2005/0182680 A1 | 8/2005 | Jones, III et al. | |
| 2005/0183023 A1 | 8/2005 | Maruyama et al. | |
| 2005/0231767 A1* | 10/2005 | Brake et al. | 358/474 |
| 2006/0007123 A1* | 1/2006 | Wilson et al. | 345/156 |
| 2006/0036944 A1 | 2/2006 | Wilson | |
| 2006/0048224 A1 | 3/2006 | Duncan et al. | |
| 2006/0073891 A1 | 4/2006 | Holt | |
| 2006/0117669 A1 | 6/2006 | Baloga et al. | |
| 2006/0126128 A1 | 6/2006 | Ahmed et al. | |
| 2006/0158703 A1* | 7/2006 | Kisilev et al. | 358/504 |
| 2006/0176524 A1 | 8/2006 | Willrich | |
| 2006/0209363 A1 | 9/2006 | Suenaga et al. | |
| 2006/0212486 A1 | 9/2006 | Kennis et al. | |
| 2006/0267966 A1 | 11/2006 | Grossman et al. | |
| 2007/0026372 A1 | 2/2007 | Huelsbergen | |
| 2007/0055929 A1 | 3/2007 | Giannetti et al. | |
| 2007/0083666 A1 | 4/2007 | Apelbaum | |
| 2007/0143624 A1 | 6/2007 | Steeves | |
| 2007/0156811 A1 | 7/2007 | Jain et al. | |
| 2007/0207416 A1* | 9/2007 | Netsch | 430/334 |
| 2007/0220444 A1 | 9/2007 | Sunday et al. | |
| 2007/0239471 A1 | 10/2007 | Patton et al. | |
| 2008/0019746 A1 | 1/2008 | Takiyama et al. | |
| 2008/0028321 A1 | 1/2008 | Weksler et al. | |
| 2008/0052319 A1 | 2/2008 | Dunning et al. | |
| 2008/0127302 A1 | 5/2008 | Qvarfordt et al. | |
| 2008/0130946 A1* | 6/2008 | Wiersma | 382/101 |
| 2008/0137157 A1 | 6/2008 | Bannai | |
| 2008/0192059 A1 | 8/2008 | Kennedy | |
| 2008/0214233 A1 | 9/2008 | Wilson et al. | |
| 2008/0270230 A1 | 10/2008 | Hendrickson et al. | |
| 2008/0281851 A1* | 11/2008 | Izadi et al. | 707/102 |
| 2008/0288862 A1 | 11/2008 | Smetters et al. | |
| 2009/0003649 A1* | 1/2009 | Wakabayashi | 382/100 |
| 2009/0091529 A1 | 4/2009 | Do et al. | |
| 2009/0091539 A1 | 4/2009 | Do et al. | |
| 2009/0094515 A1 | 4/2009 | Do et al. | |
| 2009/0094561 A1 | 4/2009 | Do et al. | |
| 2009/0113294 A1 | 4/2009 | Sanghavi et al. | |
| 2009/0138723 A1 | 5/2009 | Nyang et al. | |
| 2009/0150983 A1 | 6/2009 | Saxena et al. | |
| 2009/0150986 A1 | 6/2009 | Foreman | |
| 2009/0218707 A1* | 9/2009 | Stover et al. | 264/1.34 |
| 2009/0232409 A1 | 9/2009 | Marchesotti | |
| 2009/0262380 A1 | 10/2009 | Puigardeu et al. | |
| 2009/0328163 A1 | 12/2009 | Preece | |
| 2010/0020365 A1 | 1/2010 | Do et al. | |
| 2010/0033772 A1* | 2/2010 | Borison et al. | 358/474 |
| 2010/0189345 A1* | 7/2010 | Reddy et al. | 382/164 |
| 2011/0066573 A1* | 3/2011 | Fijnvandraat | 705/404 |
| 2011/0069357 A1* | 3/2011 | Austin et al. | 358/474 |
| 2011/0091946 A1* | 4/2011 | Teixeira Tage Biaggio et al. | 435/134 |
| 2011/0122432 A1 | 5/2011 | Do et al. | |
| 2011/0122459 A1 | 5/2011 | Do et al. | |

FOREIGN PATENT DOCUMENTS

| | | |
|---|---|---|
| EP | 0543566 A2 | 5/1993 |
| EP | 1315071 A1 | 5/2003 |
| EP | 1621989 A2 | 2/2006 |
| JP | 62122459 A | 6/1987 |
| JP | 62266964 | 11/1987 |
| JP | 63182770 A | 7/1988 |
| JP | 2000148396 A | 5/2000 |

| | | | |
|---|---|---|---|
| JP | 2006139615 A | 6/2006 |
| JP | 2006180260 A | 7/2006 |
| JP | 2007148620 A | 6/2007 |
| JP | 2007265149 A | 10/2007 |
| WO | 0101391 A1 | 1/2001 |
| WO | 03036415 A2 | 5/2003 |
| WO | 2004068421 A2 | 8/2004 |
| WO | WO2005/052720 A2 | 6/2005 |

OTHER PUBLICATIONS

U.S. Appl. No. 12/178,294, filed Jul. 23, 2008, Do et al.

USPTO Final Office Action dated Oct. 18, 2011 for U.S. Appl. No. 11/868,474, 17 Pages.

USPTO Final OFfice Action dated Dec. 10, 2010 for U.S. Appl. No. 11/869,313, 22 Pages.

USPTO Final Office Action dated Dec. 9, 2010 for U.S. Appl. No. 11/868,766, 18 Pages.

USPTO Final Office Action dated Mar. 1, 2011 for U.S. Appl. No. 11/868,474, 18 Pages.

USPTO Final Office Action dated Mar. 3, 2011 for U.S. Appl. No. 11/868,216, 13 Pages.

USPTO Final Office Action dated May 24, 2011 for U.S. Appl. No. 11/869,313, 18 Pages.

USPTO Final Office Action dated Aug. 4, 2011 for U.S. Appl. No. 11/868,766, 15 Pages.

USPTO Notice of Allowance dated May 16, 2011 for U.S. Appl. No. 11/869,987, 7 Pages.

USPTO Office Action dated Jan. 28, 2011 for U.S. Appl. No. 11/869,313, 12 Pages.

USPTO Office Action dated Oct. 15, 2010 for U.S. Appl. No. 11/950,872, 10 Pages.

USPTO Office Action dated Oct. 29, 2010 for U.S. Appl. No. 11/868,474, 19 Pages.

USPTO Office Action dated Nov. 30, 2010 for U.S. Appl. No. 11/869,987, 8 Pages.

USPTO Office Action dated Dec. 10, 2010 for U.S. Appl. No. 11/868,513, 17 Pages.

USPTO Office Action dated Apr. 14, 2011 for U.S. Appl. No. 11/868,766, 14 Pages.

USPTO Office Action dated Jun. 23, 2011 for U.S. Appl. No. 11/868,474, 16 Pages.

USPTO Office Action dated Aug. 20, 2010 for U.S. Appl. No. 11/868,216, 11 Pages.

USPTO Office Action dated Aug. 3, 2011 for U.S. Appl. No. 11/868,216, 11 Pages.

USPTO Office Action dated Aug. 5, 2010 for U.S. Appl. No. 11/869,313, 17 Pages.

USPTO Office Action dated Aug. 6, 2010 for U.S. Appl. No. 11/868,513, 19 Pages.

USPTO Office Action dated Aug. 6, 2010 for U.S. Appl. No. 11/868,766, 18 Pages.

PCT Search Report dated Dec. 29, 2008, regarding International Application No. PCT/EP2008063007, 2 Pages.

PCT Search Report dated Feb. 5, 2009, regarding International Application No. PCT/EP2008063006, 3 Pages.

Gronbaek et al., "iGameFloor—A Platform for Co-Located Collaborative Games," Proceedings of the international Conference on Advances in Computer Entertainment Technology, ACE '07, Jun. 2007, vol. 203, pp. 1-8.

Bollacker et al., "A System for Automatic Personalized Tracking of Scientific Literature on The Web," Proceedings of the Fourth ACM Conference on Digital Libraries, Aug. 1999, pp. 105-113.

Augsten et al., "Multitoe: High Precision Interaction with Back-Projected Floors Based on High-Resolution Multi-Touch Input," UIST '10 Proceedings of the 23nd annual ACM symposium on User interface software and technology, Oct. 2010, 10 pps.

Athanasopouloos et al., "Enhanced CAPTCHAs: Using Animation to tell Humans and Computers Apart", Communications and Multimedia Security LNCS (2006), vol. 4237, pp. 97-108.

Izadi et al., "Dynamo: A public interactive surface supporting cooperative sharing and exchange of media", UIST 2003 Proceedings of the 16th annual ACM symposium on User interface software and technology, Chi Letters, vol. 5, Iss. 2, Nov. 2003, pp. 159-168.

Bohte et al., "Market-Based Recommendation: Agents that Compete for Consumer Attention", ACM Transactions on Internet Technology, vol. 4, No. 4, Nov. 2004, 29 Pages.

Lemon et al., "Multithreaded Context for Robust Conversational Interfaces: Context-Sensitive Speech Recognition and Interpretation of Corrective Fragments", ACM Transactions on Computer-Human Interaction, Sep. 2004, vol. 11, No. 3, 27 Pages.

Gabriel et al., "Conscientious Software", ACM 1-59593-348-4/06/0010, Sun Microsystems, Inc., Oct. 2006, 18 Pages.

McTear, "Spoken Dialogue Technology: Enabling the Conversational User Interface", ACM Computing Surveys, vol. 34, No. 1, Mar. 2002, 97 Pages.

Jagadish et al., "Making Database Systems Usable", SIGMOD '07, ACM 978-1-59593-686-8/07/0006, Mar. 2002, vol. 34, No. 1, 12 Pages.

Ashdown et al., "Escritoire: A Personal Projected Display", IEEE Multimedia, vol. 12, Issue 1, Jan.-Mar. 2005, pp. 34-42.

Marshall et al., "Exploring The Relationship Between Personal and Public Annotations", Proceedings of the 4th ACM/IEEE-CS Joint Conference on Digital Libraries (JCDL '04), Jun. 2004, 9 Pages.

Microsoft: "Microsoft Launches New Product Category: Surface Computing Comes to Life in Restaurants, Hotels, Retail Locations and Casino Resorts", Microsoft News Center, Microsoft Website, May 2007, 3 Pages.

USPTO Final office action dated Feb. 18, 2011 regarding U.S. Appl. No. 11/950,872, 18 Pages.

PCT Search Report dated Jan. 29, 2008, regarding International Application No. PCT/EP2008063005, 3 Pages.

USPTO Final Office Action dated Apr. 15, 2011 for U.S. Appl. No. 11/868,513, 11 Pages.

USPTO Office Action dated Jul. 28, 2011 for U.S. Appl. No. 11/868,513, 12 Pages.

USPTO Final Office Action dated Jan. 20, 2012 for U.S. Appl. No. 11/868,216, 13 Pages.

USPTO Office Action dated Jun. 9, 2011 for U.S. Appl. No. 12/178,294, 12 Pages.

USPTO Office Action dated Dec. 16, 2011 for U.S. Appl. No. 11/178,294, 7 Pages.

USPTO Notice of Allowance dated Dec. 5, 2011 for U.S. Appl. No. 11/868,513, 13 Pages.

USPTO Office Action dated Feb. 8, 2012 for U.S. Appl. No. 12/624,753, 17 Pages.

USPTO Office Action dated Feb. 16, 2012 for U.S. Appl. No. 12/624,763, 34 Pages.

USPTO Non-Final Office Action dated Jul. 23, 2012 for U.S. Appl. No. 12/624,753, 13 pages.

USPTO Final Office Action dated Jun. 20, 2012 for U.S. Appl. No. 12/624,763, 37 pages.

USPTO Non-Final Office Action dated Jun. 14, 2012 for U.S. Appl. No. 12/353,329, 21 pages.

USPTO Non-Final Office Action dated Oct. 27, 2011 for U.S. Appl. No. 12/353,329, 22 pages.

* cited by examiner

SCANNING AND CAPTURING DIGITAL IMAGES USING RESIDUE DETECTION

BACKGROUND OF THE INVENTION

1. Field of the Invention

The present invention relates generally to a document scanning system and in particular to scanning and capturing digital images using residue detection.

2. Description of the Related Art

Scanners are an important part of a word processing and/or personal computer environment. A scanner is a device that optically scans printed or handwritten paper documents, objects, and photographs and creates digital images. One example of a scanner is a desktop or flatbed scanner that comprises a glass window on which a document is placed. A light positioned under the glass window is moved across the document to capture a digital image of the document and store the image in memory. With the digital image in memory, the image may be displayed, copied, transferred, printed, or altered as desired.

Scanning software, called a driver, is utilized to capture an image of a document. TWAIN is a common software language that scanner manufacturers use to communicate with scanners. The TWAIN driver acts as an interpreter between any application that supports the TWAIN standard and the scanner. The user configures the controls provided by the TWAIN driver to specify the scanning mode (e.g., color or black and white), the scanning resolution (e.g., 100 dpi or 200 dpi), the area on the flatbed glass window to be scanned, and other scanning characteristics, such as desired tonal quality and color balance of the scanned image. Once a document that has been placed on the glass window has been scanned, the TWAIN driver transfers the scanned image into memory.

After the images are stored in memory, a user may need to edit a scanned image because the image contains unwanted or irrelevant detail. A user may edit the scanned image using a graphics editing software product such as Adobe® Photoshop®. The graphics editing software enables a user to remove unwanted detail by cropping the image. Cropping refers to removing unnecessary or unwanted portions of the image, thereby improving the overall composition of the document.

BRIEF SUMMARY OF THE INVENTION

The illustrative embodiments provide a mechanism for scanning and capturing digital images using residue detection. Upon detecting a document placed on a scanning surface of a scanning device, the illustrative embodiments detect a residue deposited on the document. The illustrative embodiments determine a portion of the document to be scanned based on a location of the residue on the document. The illustrative embodiments then scan the portion of the document.

DETAILED DESCRIPTION OF THE INVENTION

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The illustrative embodiments provide an intelligent scanner for capturing a digital image of a document based on residue detection. Residue is defined as any visible or invisible substance that comprises chemical, light-emitting, or light-absorbing properties that remain on a surface after the object that deposited the residue is removed from the surface. Ink from a pen is one example of residue. In one embodiment, ink may comprise ultraviolet (UV) invisible fluorescent ink which comprises UV compounds that may only be detected when illuminated by ultraviolet light. When a user uses a UV ink pen to write on a document, the UV properties of the ink deposited from the pen remain on the document for detection by applying UV light to the document. In another embodiment, the residue may comprise non-fluorescent properties, such as chemical elements from a fingerprint. Humans excrete various chemical substances in sweat, including sodium, potassium, and chlorine, which can be present in detectable quantities.

With the illustrative embodiments, a user may select a desired portion of a document to be scanned by first tracing a portion of the document with a residue-depositing object. In one embodiment, the trace may be performed by having the user outline a portion of the document with fluorescent ink. The contact of the ink with the document deposits detectable light-emitting residue onto the document surface. The trace may also be performed without requiring the object to come into contact with the document surface. For instance, the residue may be dispensed or dropped from the object at a distance from the document. The user then places the document onto the scanning surface of the scanning device. The scanning software in the intelligent scanner detects the presence of residue on the document to be scanned using residue detection technology.

Typically, scanners comprise cold cathode fluorescent lamps ('CCFL'), xenon lamps, standard fluorescent lamps, or diodes which are used to illuminate the document for scanning and a moving optical array or charged-coupled device ('CCD') array comprising a collection of tiny light-sensitive diodes is used to collect the light reflected by the document. The illustrative embodiments modify these existing scanners to include residue detection technology. In one embodiment, a scanner may be modified to include a lamp comprising a UV light-emitting diode (LED). The UV light-emitting diode within the scanner housing emits light capable of inducing fluorescence in the ink residue. The embodiment relies upon the unique physical property of various materials to fluoresce when excited by certain wavelengths of light. Fluorescence is generally understood to be a property that enables some materials to absorb light energy and to radiate visible light at a longer wavelength than the absorbed light. According to generally accepted theory, electrons in fluorescent materials are excited upon being illuminated by light energy of a specific absorption band wavelength, and emit light energy in a longer wavelength response band as the electrons return to the unexcited or ground state. The specific excitation and response wavelengths are characteristics of the particular fluorescent materials. The deposited ink may fluoresce in the visible portion of the light spectrum upon exposure to ultraviolet light. In another embodiment, the scanner may be modified to include a micro-x-ray fluorescence machine. Micro-X-ray fluorescence, or MXRF, is currently used to detect chemical fingerprint elements where they have been deposited on a surface, thereby allowing patterns of a fingerprint to be seen and examined. The intelligent scanner may comprise an MXRF machine to detect the residue deposited from a user tracing a portion of the document.

Once the scanning software in the intelligent scanner detects the residue deposited on the document, the scanner scans a portion of the document based on the location of the detected residue. For instance, when photoreceptors in the scanner that are sensitive to the UV emission spectra of the ink detect the fluorescence in the ink deposited on the document, the scanning software in the scanner employs the traditional scanning lamps (e.g. CCFL) to illuminate the document and the CCD array to capture the portion of the document based on the residue trace detected by the photoreceptors. In this manner, the user may easily edit (i.e., crop) the document while the document is being scanned, rather than post-processing the digital image of the document by cropping the document that has already been scanned in its entirety. Thus, if the user selects the center portion of the document for scanning by depositing UV ink to trace a circle in the center portion of the document, the scanning software may scan and capture only the portion of the document within the circle. It should be noted that the user may define how the scanning software should interpret the traced areas. For instance, for a trace comprising closed areas (e.g., square, circle, hexagon, etc.), the user may configure the scanning software to either automatically scan the document area located within the trace or, alternatively, scan the document area located outside of the trace. For traces that do not comprise a closed area, the user may specify that the scanning software scan and capture an area of the document based on a proximity rule, wherein the proximity rule specifies that the scanning software either scans the area of the document located within a certain distance of the trace or omits scanning the area of the document located within a certain distance of the trace.

Figure 1:
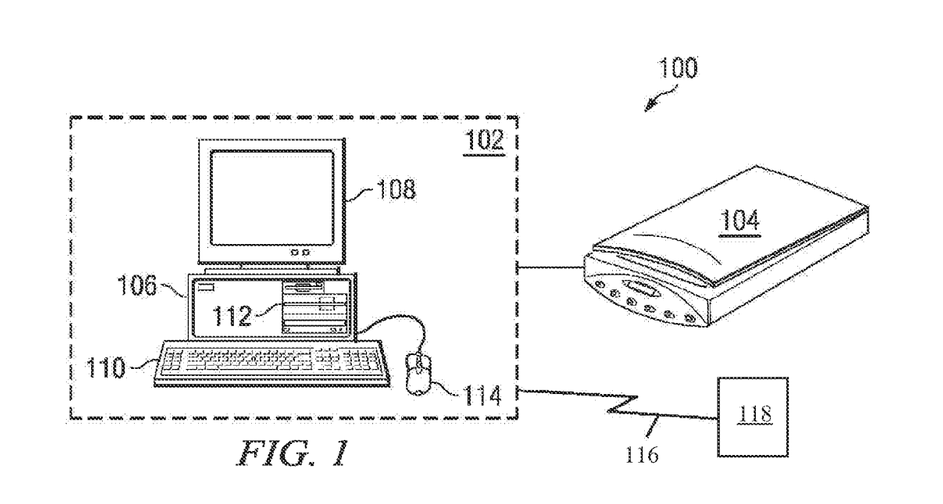
FIG. 1 is a block diagram of an exemplary document scanning system for capturing a digital image of an object in accordance with the illustrative embodiments.

With reference now to the figures and in particular with reference to FIG. 1, a pictorial representation of an exemplary computer system for capturing a digital image of an object in accordance with the illustrative embodiments is shown. In this illustrative example, data processing system 100 comprises a computer 102 and a scanning or managed device 104. Computer 102 includes system unit 106, video display terminal 108, keyboard 110, storage unit 112, which may include floppy drives and other types of permanent and removable storage media, and mouse 114. Additional input devices may be included with personal computer 102, such as, for example, a joystick, touchpad, touch screen, trackball, microphone, and the like. Computer 102 may be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 102 may also include a graphical user interface (GUI) that may be implemented by means of systems software residing in computer readable media in operation within computer 102.

Scanning device 104 may be connected to computer 102 via wire links, wireless communication links, or fiber optic cables. In the depicted example, scanning device 104 is a flatbed scanner that comprises a glass window. When a document is placed on the glass window, a light positioned under the glass window is moved across the document to capture a digital image of the document and store the image in memory. The portions of the document that are actually captured by scanning device 104 in accordance with the illustrative embodiments are described in further detail in FIGS. 3-5.

Figure 2:
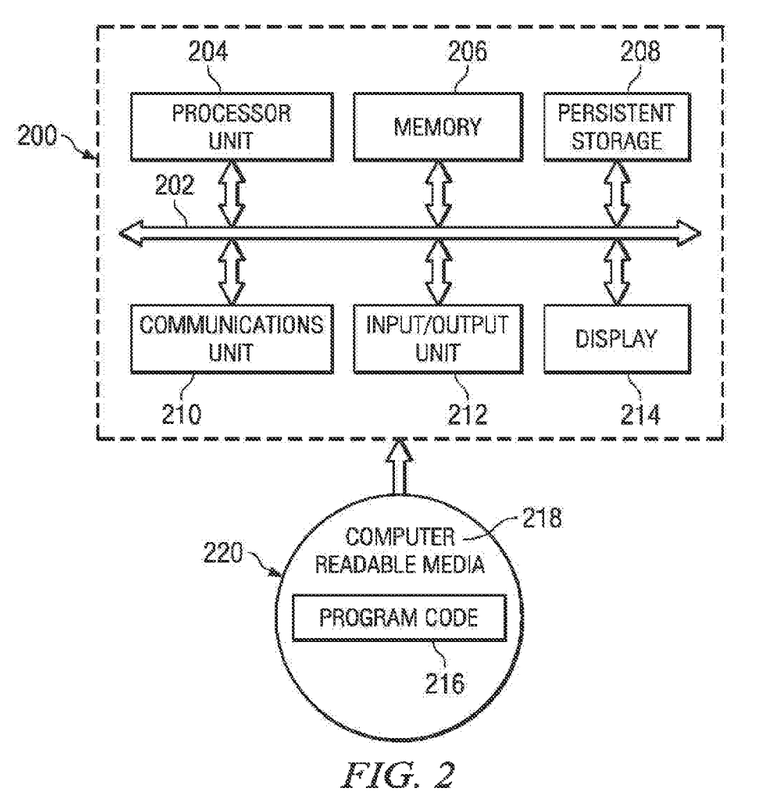
FIG. 2 is a block diagram of a data processing system with which the illustrative embodiments may be implemented.

Turning now to FIG. 2, a block diagram of an exemplary data processing system with which the illustrative embodiments may be implemented. Data processing system 200 is an example of a computer, such as computer 102 shown in FIG. 1 or computer 308 in FIG. 3, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208. Within memory 206 or persistent storage 208, computer program instructions for an object display application for displaying an image of an object placed on the surface of scanning device 104 in FIG. 1 are provided. The object display application may operate generally for displaying an image on display 214 of an object placed on the scanning device by: detecting an object placed on the scanning surface, identifying a region of the surface upon which the object is placed, scanning, using the scanner, the identified region of the surface to create an object image of the object, and rendering the object image within the identified region. The object placed on the scanning surface may be implemented as a pictorial document such as a photograph or other printed graphic image, a text document, a hand, a portable computing device, or any other object as will occur to those of skill in the art.

In addition, a set of computer program instructions for a scanner device driver for operating scanner 104 in FIG. 1 is also provided within persistent storage 208 and is loaded into memory 206. The scanner device driver comprises scanning software that exposes an application programming interface ('API') to the object display application that may be used to scan a region of the scanning surface to create an image of any objects placed in the region. The scanner device driver may be implemented in any number of ways and provide a variety of interfaces as will occur to those of skill in the art, including those according to the TWAIN specification promulgated by the TWAIN Working Group, the Image and Scanner Interface Specification ('ISIS') developed by Pixel Translations, the Scanner Access Now Easy ('SANE') specification, and so on.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 216 may be downloaded over a network to persistent storage 208 from another device or data processing system for use within data processing system 200. For instance, program code stored in a computer readable storage medium in a server data processing system may be downloaded over a network 116 from the server 118 to data processing system 200. The data processing system providing program code 216 may be a server computer, a client computer, or some other device capable of storing and transmitting program code 216.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

The different embodiments may be implemented using any hardware device or system capable of executing program code. As one example, the data processing system may include organic components integrated with organic components and/or may be comprised entirely of organic components excluding a human being. For example, a storage device may be comprised of an organic semiconductor. As another example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Figure 3:
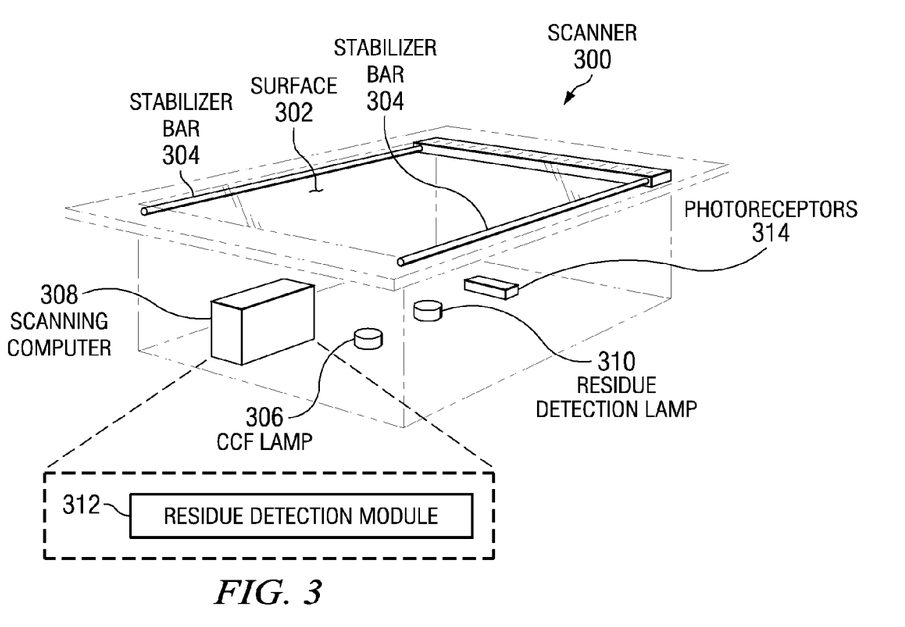
FIG. 3 is a block diagram of a scanning system with which the illustrative embodiments may be implemented.

FIG. 3 is a block diagram of a scanning device with which the illustrative embodiments may be implemented. Scanner 300 is a device that captures a digital image of an object. In this illustrative example, scanner 300 is implemented using a charged-coupled device ('CCD') array. The CCD array is a collection of tiny light-sensitive diodes, which convert photons into electrons. Each diode is called a photosite and is sensitive to light—the brighter the light that hits a single photosite, the greater the electrical charge that will accumulate at that site. The image of the object scanned reaches the CCD array through a series of mirrors, filters and lenses. The exact configuration of these components will vary from one embodiment to another. Scanner 300 includes one or more lamps 306 to illuminate the object. The lamps may be implemented using cold cathode fluorescent lamps ('CCFL'), xenon lamps, standard fluorescent lamps, diodes, or any other implementation as will occur to those of skill in the art. The size and number of lamps may be configured in scanner 300 in any number of ways as will occur to those of skill in the art to provide varying levels of granularity regarding the portion of scanning surface 302 illuminated by the lamps. In some embodiments, only the lamps directly beneath the object being scanned will be turned on to prevent obscuring any remaining portions of the surface during the scanning process.

Scanner 300, which includes the mirrors, lens, filters, CCD array, lamps, and so on, moves across the underside of scanning surface 302 by a belt that is attached to a stepper motor. Scanner 300 is attached to stabilizer bars 304 to ensure that there is no wobble or deviation as the scanner passes beneath scanning surface 302. As scanner 300 passes beneath an object placed on scanning surface 302, the image of the object is reflected through a series of mirrors onto a lens. The lens splits the image into three smaller versions of the original. Each smaller version passes through a color filter, which is either red, green, or blue, onto a discrete section of the CCD array. Scanner 300 then combines the data from the three parts of the CCD array into a single full-color image.

Although scanner 300 is described above using CCD technology, other scanning technologies may also be useful in embodiments of the present invention. For example, a scanner in some embodiments may be implemented using contact image sensor ('CIS') technology. CIS technology replaces the CCD array, mirrors, filters, lamp and lens with rows of red, green and blue light emitting diodes ('LEDs'). The image sensor mechanism, consisting of hundreds or thousands of individual sensors spanning the width of scanning surface 302, is placed very close to scanning surface 302 on which the object rests. When the object is scanned, the LEDs combine to provide white light. The illuminated image of the object is then captured by the row of sensors. Still further, readers will appreciate that other scanning technologies may be used. The CCD scanner and the CIS scanner described above are for explanation only and not for limitation.

Scanning computer 300 also comprises residue detection lamp 310. Residue detection lamp 310 is used to illuminate the residue deposited on the object. In one embodiment, residue detection lamp 310 may comprise a UV light-emitting diode. A UV light-emitting diode within scanner 300 emits light capable of inducing fluorescence in residue comprising UV fluorescent ink. In another embodiment, residue detection lamp 310 may comprise a micro-x-ray fluorescence lamp. A micro-x-ray fluorescence lamp within scanner 300 emits x-rays that are absorbed by chemical elements in the residue at specific frequencies in the light spectrum. Although particular implementations of residue detection lamp 310 are described above, it should be noted that any residue detection device capable of generating a light source that causes residue deposited on the object to illuminate and emit a response that is captured by photoreceptors 314 in the scanner may be used.

Scanning computer 308 comprises residue detection module 312. In one embodiment, scanning computer 308 is an example of data processing system 200 in FIG. 2. When the residue traced on the object is illuminated by residue detection lamp 310 and captured by photoreceptors 314 in the scanner, the existence of and the location of the residue trace is provided to the residue detection module 312. Residue detection module 312 in scanning computer 308 comprises software for receiving the detected presence of residue on the document from the photoreceptors in the scanner and generating instructions to scanning software in memory in data processing system 200 that instruct the scanning software to scan a selected area of the object based on the detected residue trace. Based on the shape and configuration of the residue deposited on the document, residue detection module 312 identifies the selected portion of the document to be scanned. The scanning software then instructs the scanner to scan the selected area of the object.

In one embodiment, residue detection module 312 may be configured by the user to interpret the traced areas in a particular manner, such as specifying that residue detection module 312 identify, for traces comprising closed areas, the document area located within the trace or the document area located outside of the trace for scanning. In another embodiment, scanning software in memory in data processing system 200 may be configured to receive the detected residue information from residue detection module 312 and identify the area to be scanned. The user may also specify that residue detection module 312 or the scanning software in memory should, for traces comprising non-closed areas, identify an area of the document for scanning based on a residue proximity rule. Based on the area identified using the residue proximity rule, scanner 300 may scan either the area of the document located within a certain distance of the trace, or omit scanning the area of the document located within a certain distance of the trace according to the user configuration. Residue detection module 312 may also be configured to apply a threshold of contiguous pixels to the detected residue trace to determine whether an area is to be considered "selected".

It should be appreciated that FIGS. 1-3 are only exemplary and are not intended to assert or imply any limitation with regard to the environments in which different embodiments may be implemented. Many modifications to the depicted environments may be made.

Figure 4A:
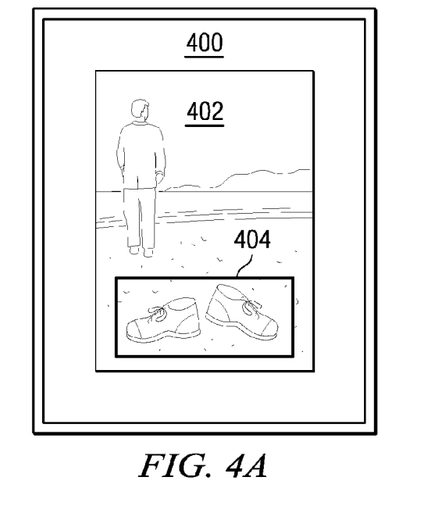
FIGS. 4A-4C illustrate a scanning surface for capturing digital images of a document based on residue detection in accordance with the illustrative embodiments.
Figure 4B:
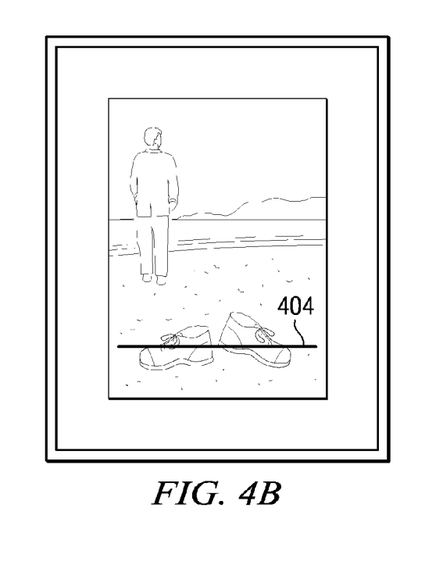
Figure 4C:
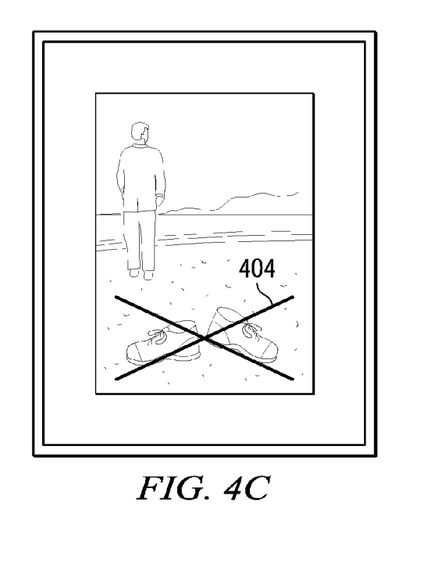

FIGS. 4A-4C illustrate a scanning surface for capturing a digital image of a document based on residue detection in accordance with the illustrative embodiments. The scanning surface is an example of scanning surface 302 in intelligent scanner 300 in FIG. 3. The intelligent scanner uses residue detector module 310 in FIG. 3 to detect residue on a document placed on scanning surface 302. Residue is any visible or invisible substance that comprises chemical, light-emitting, or light-absorbing properties that remain on a surface after the object that deposited the residue is removed from the document surface. The intelligent scanner captures only the portion(s) of the document defined by the detected residue.

In FIG. 4A, document 402 to be scanned is shown placed on scanning surface 400 (i.e., viewed from the underside of scanning surface 400). Prior to placing the document on scanning surface 400, a user identifies an area(s) of document 402 to be scanned by creating a trace or an outline of the desired area on document 402. The trace or outline of the desired area of document 402 may be created using the user's finger, using an object such as a pen, or using some other outlining or tracing means. The trace or outline may comprise any shape or formation, closed or unclosed. In this illustrative example, the trace or outline comprises a closed shape (rectangle) forming an enclosed area containing the desired subject for scanning. Other regular or irregular closed geometric shapes (e.g., circle, polygon, etc.) may be generated from the trace or outline. In embodiments as shown in FIGS. 4B and 4C, the trace or outline may comprise an unclosed shape. An unclosed shape is any trace that does not partition the document to be scanned into two or more separate areas. In these illustrative examples, the closed trace comprises one or more a horizontal or vertical lines, wherein the line ends terminate prior to reaching the edge of the document.

Regardless of the particular method used to trace or outline the desired area to be scanned and the particular shape of the trace or outline, the contact of the object utilized to create the trace or outline with document 402 deposits a detectable residue 404 onto the surface of document 402. In one example, residue 404 may include chemical elements such as sodium, potassium, and chlorine that are transferred from the user's skin to document 402 as the user creates the outline with the user's finger. In another example, residue 404 may include UV fluorescent ink deposited onto the document surface. The interior area defined by residue 404 in this example is shown to comprise a particular subject (shoes). The user then places document 402 face down onto scanning surface 400 as shown. In circumstances in which depositing the residue onto the document may alter the document, a transparent overlay may be used to maintain the quality of the document. For instance, ink residue from a pen will alter the original quality of document. The user may first place a transparent sheet over the document and use the pen to trace or outline the desired area of the document on the transparent sheet, without affecting the document itself. The document and the transparent overlay are then placed onto scanning surface 400.

Scanner 300 in FIG. 3 comprises a residue detection module that detects the presence and location of residue 404 on document 402 (or on the transparent overlay) using existing residue detection technology, such as micro-X-ray fluorescence. The residue detection module may inform the scanning software loaded in memory in data processing system 200 in FIG. 2 (or within the residue detection module itself) that the document to be scanned comprises residue. The scanning software may be configured by the user to define how the scanning software should interpret the residue trace or outline. The user may configure the scanning software to first determine if the residue detected by the residue detection technology is a valid (i.e., recognized) residue. In other words, the scanning software may be configured by the user to only capture a portion of document 402 if the residue substance detected is recognized by the scanning software as an acceptable or known residue substance. If the scanning software determines residue 404 is not a valid residue, the scanning software performs a traditional scan and captures a digital image of the document in its entirety. However, if residue 404 is determined to be a valid residue, the scanning software captures only a portion of document 402 based on the location of residue 404.

The user may also configure the scanning software by specifying which portion of document 402 should be captured. The user may specify that if the residue in the form of a closed shape is detected on the document, the scanning software will automatically scan only the area of document 402 that is encapsulated by the detected residue. Alternatively, the user may specify that the scanning software will automatically scan only the area of document 402 located outside of the detected residue. If the residue comprises an unclosed shape, the scanning software may be configured to scan (or omit) only the area of the document within the residue. In another embodiment, the user may configure the scanning software to implement a proximity algorithm that identifies the area of the document to be scanned as the area located within a certain distance of the residue trace. For example, the proximity algorithm may identify the area to be scanned (or omitted) as the area of the document within 5 centimeters of the trace. The proximity algorithm may also connect points in the trace to form a virtual polygon. For example, if the trace comprises an "X" shape, the proximity algorithm may create a virtual polygon by drawing straight lines between the residue trace to form a rectangle. The area inside or the area outside of the virtual rectangle may be scanned based on the configuration settings specified by the user. In another example, if the trace comprises separate dots on the document, the proximity algorithm may either create a virtual polygon by drawing lines between the dots and identify the area inside or outside of the polygon for scanning, or the proximity algorithm may determine the area(s) to be scanned are the areas located within a particular distance (e.g., circumference) from each dot.

The proximity algorithm may also be configured to omit scanning the area located within a certain distance of the unenclosed residue trace. For instance, if a document to be scanned includes unwanted or confidential text that should be redacted, the user may trace a line through the unwanted text with the user's finger. As the document is being scanned, the proximity algorithm will omit the area of the text located within a certain distance of the residue deposited from the user's finger.

Figure 5:
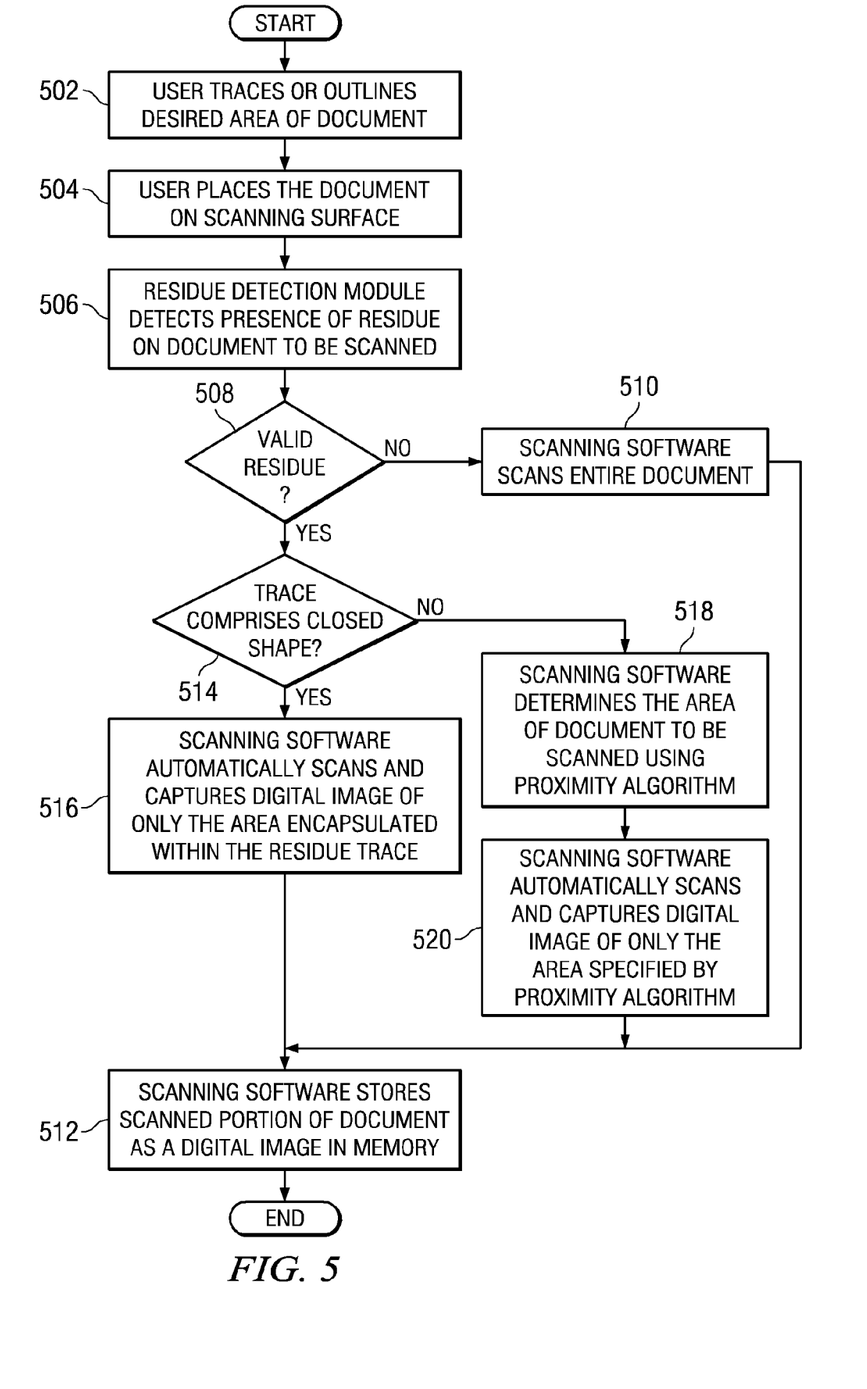
FIG. 5 is a flowchart of a process for capturing a digital image of a document based on residue detection in accordance with the illustrative embodiments.

FIG. 5 is a flowchart of a process for capturing a digital image of a document based on residue detection in accordance with the illustrative embodiments. The process begins with a user tracing or outlining a desired area of a document (step 502). The user may trace or outline a portion of the document using any object that is capable of depositing a residue onto the document. The user then places the document onto the scanning surface of the intelligent scanner, such as scanner 300 in FIG. 3 (step 504).

Once the document is positioned on the scanning surface, the residue detection module within the scanner detects the presence of residue on the document to be scanned (step 506). In one embodiment, the residue detection module uses micro-X-ray fluorescence to detect the chemical residue elements in the locations they have been deposited on the document by the user. In one embodiment, the residue detection module uses UV light to detect the fluorescence of UV ink in the locations deposited on the document. The scanning software loaded into memory in data processing system 200 in FIG. 2 (or the residue detection module depending upon the particular implementation used) makes a determination as to whether the particular residue detected by the residue detection module is a valid residue (step 508). If the detected residue is not a valid residue ('no' output of step 508), the process performs a scan of the entire document in a traditional manner (step 510). The scanned portion is then stored as a digital image in memory (step 512), with the process terminating thereafter.

Turning back to step 508, if the detected residue is a valid residue ('yes' output of step 508), the scanning software examines the type of residue trace and determines if the trace comprises a closed shape (step 514). If the residue trace is determined to comprise a closed shape ('yes' output of step 514), the scanning software then automatically scans and captures a digital image of only the area encapsulated within the residue trace (step 516). In an alternative embodiment, the user may configure the scanning software to automatically scan only the area outside the residue trace rather than the area within the residue trace. In another embodiment, the scanning software may prompt the user to manually select whether the user wants the scanner to capture the area within the trace or capture the area outside of the trace. The scanned portion is then stored as a digital image in memory (step 512), with the process terminating thereafter.

Turning back to step 514, if the residue trace is determined not to comprise a closed shape ('no' output of step 514), the scanning software determines the area of the document to be scanned using a proximity algorithm (step 518). The scanning software then automatically scans and captures a digital image of only the area specified by the proximity algorithm (step 520). The scanned portion is then stored as a digital image in memory (step 512), with the process terminating thereafter.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for scanning a document, the computer implemented method comprising:
   detecting a document placed on a scanning surface of a scanning device;
   detecting a residue deposited on the document;
   determining a portion of the document to be scanned based on a location of the residue on the document; and
   scanning the portion of the document;
   wherein determining a portion of the document to be scanned based on a location of the residue on the document further comprises:
   determining whether the residue on the document forms an enclosed area;
   responsive to determining that the residue of the document forms an enclosed area, determining the portion of the document to be scanned using the enclosed area; and
   responsive to determining that the residue of the document does not form an enclosed area, determining the portion of the document to be scanned using a proximity algorithm, wherein the proximity algorithm specifies that the portion of the document to be scanned is located outside of a particular circumference of the residue using a virtual polygon that is formed using the unenclosed area to define the particular circumference.

2. The computer implemented method of claim 1, wherein the proximity algorithm specifies that the portion of the document to be scanned is located within a particular distance from the residue.

3. The computer implemented method of claim 1, wherein the residue is deposited by a finger in contact with the document.

4. The computer implemented method of claim 3, wherein the residue is deposited on a transparent overlay coupled to the document.

5. The computer implemented method of claim 3, wherein the residue is a chemical substance.

6. The computer implemented method of claim 1, wherein the residue is detected on the document using micro-X-ray fluorescence.

7. The computer implemented method of claim 1, wherein a portion of the document is scanned if the residue is determined to be a valid residue.

8. The computer implemented method of claim 1, wherein scanning the portion of the document based on a location of the residue on the document is performed by a residue detection module and a plurality of different types of light sources within a scanner device to form a scanned image representing an edited image of the document.

9. A data processing system for scanning a document, the data processing system comprising:
   a bus;
   a storage device connected to the bus, wherein the storage device contains computer usable code;
   a processing unit connected to the bus;
   a communications unit connected to the bus; and
   at least one managed device connected to the bus, wherein the at least one managed device comprises a plurality of different types of light sources and executes the computer usable code to detect a document placed on a scanning surface of a scanning device using a first type of light source; detect a residue deposited on the document using a second type of light source; determine a portion of the document to be scanned based on a location of the residue on the document; scan the portion of the document; and send the scanned portion of the document to the processing unit, wherein the computer usable code to determine a portion of the document to be scanned based on a location of the residue on the document further comprises computer usable program code to determine whether the residue on the document forms an enclosed area; determine, responsive to determining that the residue of the document forms an enclosed area, the portion of the document to be scanned using the enclosed area; and determine, responsive to determining that the residue of the document does not form an enclosed area, the portion of the document to be scanned using a proximity algorithm, wherein the proximity algorithm specifies that the portion of the document to be scanned is located outside of a particular circumference of the residue using a virtual polygon that is formed using the unenclosed area to define the particular circumference.

10. A computer program product for scanning a document, the computer program product comprising:
    a tangible computer usable storage device having computer usable program code tangibly stored thereon, the computer usable program code comprising:
    computer usable program code for detecting a document placed on a scanning surface of a scanning device;
    computer usable program code for detecting a residue deposited on the document;
    computer usable program code for determining a portion of the document to be scanned based on a location of the residue on the document; and computer usable program code for scanning the portion of the document;
wherein the computer usable program code for determining a portion of the document to be scanned based on a location of the residue on the document further comprises:
computer usable program code for determining whether the residue on the document forms an enclosed area;
computer usable program code, responsive to determining that the residue of the document forms an enclosed area, for determining the portion of the document to be scanned using the enclosed area; and
computer usable program code, responsive to determining that the residue of the document does not form an enclosed area, determining the portion of the document to be scanned using a proximity algorithm, wherein the proximity algorithm specifies that the portion of the document to be scanned is located outside of a particular circumference of the residue using a virtual polygon that is formed using the unenclosed area to define the particular circumference.

11. The computer program product of claim 10, wherein the proximity algorithm specifies that the portion of the document to be scanned is located within a particular distance from the residue.

12. The computer program product of claim 10, wherein the residue is a chemical substance, and wherein the residue is deposited by a finger in contact with the document.

13. The computer program product of claim 10, wherein the computer usable program code is stored in a computer readable storage medium in a data processing system, and wherein the computer usable program code is downloaded over a network from a remote data processing system.

14. The computer program product of claim 10, wherein the computer usable program code is stored in a computer readable storage medium in a server data processing system, and wherein the computer usable program code is downloaded over a network from a remote data processing system for use in a computer readable storage medium with the remote system.

* * * * *